United States Patent Office
3,736,332
Patented May 29, 1973

3,736,332
METHOD FOR THE PREPARATION OF
4,5,6,7-TETRAHYDROINDAZOLES
Ivan Butula, Zagreb, Yugoslavia, assignor to PLIVA, Pharmaceutical and Chemical Works, Zagreb, Yugoslavia
No Drawing. Filed Sept. 18, 1970, Ser. No. 73,643
Claims priority, application Germany, Sept. 26, 1969, P 19 48 793.5
Int. Cl. C07d 49/18
U.S. Cl. 260—310 R       11 Claims

ABSTRACT OF THE DISCLOSURE

A method for the preparation of 4,5,6,7,-tetrahydroindazoles of the formula:

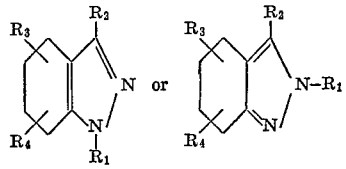

in which an indazole of the general formula:

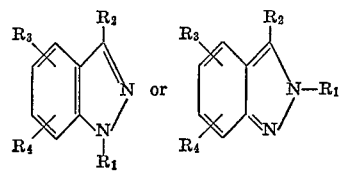

is hydrogenated in the presence of palladium, rhodium or platinum or catalysts containing mixtures of them and in the presence of a strong acid in a molar equivalent at least equal to that of the basic groups.

(1) FIELD OF THE INVENTION

Our present invention relates to a method of making 4,5,6,7-tetrahydroindazoles.

(2) BACKGROUND OF THE INVENTION

Many indazole derivatives and their preparation have been described in the literature but the corresponding 4,5,6,7-tetrahydroindazoles have often been neglected. With a few exceptions, the tetrahydro compounds have been prepared by total synthesis from substituted cyclohexanones and hydrazine derivatives. Tetrahydroindazoles have not been prepared by hydrogenation of the often readily obtainable indazoles because of the difficulties encountered in the hydrogenation of indazoles. K. Fries, K. Fabel, and H. Echardt (Liebigs Ann. Chem. 550, 31, 1942) reported about their difficulties with such hydrogenation, difficulties they attributed to an inhibition of the catalyst by the indazole. They could not hydrogenate the indazole over palladium in glacial acetic acid; only by using large quantities of platinum (2 g. platinum with 1.2 g. indazole), were they able to complete the hydrogenation in 10 days. The hydrogenation of 1-methylindazole was somewhat easier (1 part platinum to 1 part 1-methylindazole in 40 hours), while that of 2-methylindazole (0.27 part platinum to 1 part 2-methylindazole in 12 hours) was even faster.

(3) OBJECTS OF THE INVENTION

An object of the invention is to present a new method for the preparation of known and previously unknown 4,5,6,7-tetrahydroindazoles which is technically simpler than earlier systems as well as more rapid than the latter while producing good yields.

(4) SUMMARY OF THE INVENTION

Surprisingly, it has been found that indazole itself, as well as various substituted indazoles could, in certain conditions, be easily, rapidly and with good yields, hydrogenated to the corresponding 4,5,6,7-tetrahydroindazole with palladium catalysts as well as with platinum and rhodium catalysts.

The invention concerns a new method for the preparation of 4,5,6,7-tetrahydroindazoles of the general Formula Ia or Ib:

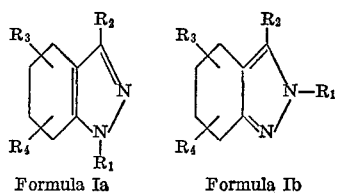

Formula Ia    Formula Ib in which:

$R_1$ is a hydrogen atom; an unbranched or branched alkyl group with 1 to 18 carbon atoms (C-atoms), preferably 1 to 4 C-atoms; a hydroxyalkyl or carboxyalkyl group with 1 to 4 C-atoms in the alkyl group; a 5- or 6-member cycloalkyl, alkylcycloalkyl or cycloalkylalkyl group; an aryl, an alkylaryl or an arylalkyl group; a glucosyl, arabinosyl, xysolyl, ribosyl or another sugar group derived from hexoses, pentoses or tetroses, or the group A–Z, in which A is an unbranched or branched alkyl group with 1 to 4 C-atoms and Z is an amino, lower monoalkylamino, lower dialkylamino, morpholino, N-pyrrolidino, N-piperidino, N-piperazino, N'-piperazino, N'-lower-alkyl-N-piperazino, N'-(ω-hydroxy-lower-alkyl)-N-piperazino or N' - (ω-hydroxyalkoxy-lower-alkyl)-N-piperazino group;

$R_2$ is a hydrogen atom; an unbranched or branched alkyl group with 1 to 20 C-atoms, the trifluoromethyl, hydroxymethyl or carboxyl group, a carboxyalkyl group with 1 to 4 C-atoms, a dialkylaminoethylaminocarbonylalkyl, dialkylaminoethylaminocarbonyl, or dialkylaminoethoxycarbonylalkyl group with 1 to 4 C-atoms in the alkyl groups; the cyclopentyl or cyclohexyl group; an alkylcyclohexyl group with 1 to 4 C-atoms in the alkyl group; the carboxycyclohexyl group; the 2-, 3-, 4-piperidyl group; a phenyl, alkylphenyl or phenylakyl group or an alkoxyphenyl group with 1 to 4 C-atoms in the alkyl group; a tetrahydrofuryl group; an acylaminophenyl group in which the acyl group derives from an aliphatic carboxylic acid with 1 to 3 C-atoms; the fluorphenyl group; or an imidazolylalkyl-, triazolylalkyl group with 1 to 4 C-atoms in the alkyl group;

$R_3$ is a hydrogen atom, an unbranched or branched alkyl group with 1 to 18 C-atoms, preferably 1 to 4 C-atoms; a carboxyl group or an alkoxycarbonyl group with 1 to 4 C-atoms in the alkoxy group or an alkoxycarbonyl group with 1–4 C-atoms in the alkyl group;

and $R_4$ is a hydrogen atom or an unbranched or branched alkyl group with 1 to 4, preferably 1 or 2 C-atoms.

In the method of the invention, an indazole * of the general Formula IIa and IIb

---

*See Wiley, R. H. (Editor): Pyrazoles, Pyrazolines, Pyrazolidines, Indoles and Condensed Rings, vol. 22; Chemistry of Heterocyclic Compounds, pp. 289–382, John Wiley & Sons, New York (1967) and Elderfield, R. C. (Editor): Heterocyclic Compounds, vol. 5, pp. 162–193. John Wiley & Sons, N.Y. (1957).

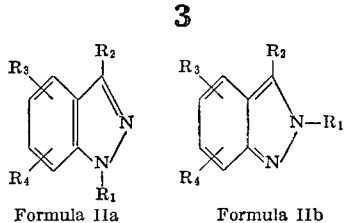

Formula IIa     Formula IIb in which $R_1$, $R_2$, $R_3$ and $R_4$ have the above-stated meaning or are their hydrogenatable unsaturated, precursors either:

(a) In the form of the acid addition salt or
(b) In the form of the free base and in the presence of at least 1 equivalent of acid per basic group, is hydrogenated in the presence of palladium, rhodium or platinum or catalysts containing mixtures of them, and if necessary, the salt of the corresponding 4,5,6,7-tetrahydroindazole is converted into the free base.

The new method of the invention for the preparation of 4,5,6,7-tetrahydroindazole derivatives follows the course shown in the following diagrams:

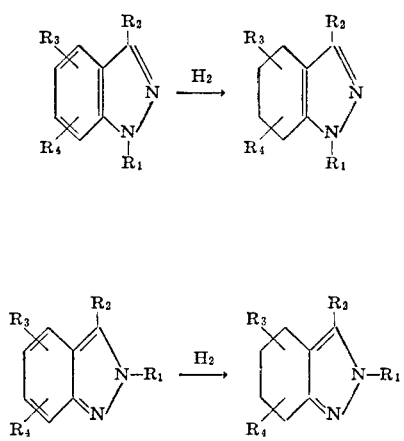

To the extent that the groups $R_1$, $R_2$, $R_3$ and $R_4$ are or carry hydrogenatable groups, they can also be hydrogenated in certain conditions.

The new method of the invention deals with a nucleus hydrogenation of the benzene nucleus in the indazole, in total absence of substitution effects. Other present aromatic groups at normal pressure are not affected or react only with difficulty. At higher reaction temperatures and reaction pressures, the 4,5,6,7-tetrahydroindazole derivatives can also be prepared after interruption of the hydrogenation at the calculated quantity of the absorbed hydrogen. With further hydrogenation, particularly when using rhodium or platinum as catalysts, the other aromatic groups can also be hydrogenated.

Thus, for example, according to the method of the invention, 2-phenylindazole at 88° C. and a pressure of 1 kg./cm.$^2$ is hydrogenated only to 2-phenyl-4,5,6,7-tetrahydroindazole. With complete hydrogenation at 120° C. and 50 kg./cm.$^2$, the 2-cyclohexyl-4,5,6,7-tetrahydroindazole is obtained. In the hydrogenation of pyridyl-substituted indazoles according to the method of the invention, the pyridine nucleus first, and finally the benzene nucleus is saturated.

The catalysts that can be used with the method of the invention are the usual palladium, platinum or rhodium catalysts, alone, or preferably on various carriers. Examples of adequate carrier substances are silicic acid, diatomite, aluminum oxide, pumice, asbestos, carbon, titanium oxide, barium sulfate, vermiculite and silica gel. Favored carriers are activated carbon, barium sulfate, titanium oxide, aluminum oxide and silica gel. The platinum metals are usually contained in the carrier catalysts in amounts of 2 to 10% by weight. The catalysts can be used several times after thorough washing, for example with water, methanol or acetic acid.

The method of the invention is carried out in a solvent or diluent in which the used indazole is at least partly soluble. Examples of adequate solvents are water, lower alkanoic acids such as acetic acid and propionic acid, lower aliphatic alcohols (lower alkanols), glycol ether, diethyl ether, tetrahydrofuran, or their mixtures.

Although in certain cases, the hydrogenation can succeed without addition of strong acids, the method of the invention is particularly suited for the hydrogenation of indazole salts or indazoles in the presence of strong acids.

The method of the invention can be carried out within a relatively wide range of temperatures at normal pressure or superatmospheric pressure. The preferred temperature range at normal pressure goes from about 0° C. to the boiling point of the solvent or diluent utilized. Under these conditions, the preferred catalyst is palladium. When working with superatmospheric pressure, palladium or rhodium should preferably be used. If possibly present aromatic substituents should also be hydrogenated, the hydrogenation is done with, depending on the compound, rhodium, palladium or platinum. The hydrogenation can be carried out from standard (atmospheric) pressure up to about 120 kg./cm.$^2$ or more. The hydrogenation can also be carried out at higher pressures and temperatures if the compounds to be hydrogenated or the hydrogenation products allow or require it.

In the following Tables I to IV, the hydrogenation results of the hydrogenation of indazoles under various conditions are shown.

TABLE I—Hydrogenation of 10 mmol. indazole in 30 ml. solvent at atmospheric pressure or of 50 mmol. indazole in 50 ml. solvent at 60 atm. gauge pressure with various 5% catalyst metal on carbon-carrier catalysts.

| Example Number | Catalyst metal (g.) | Solvent | Temp., °C. | Pressure kg./cm. | Hydrogenation time hrs. ½ | End |
|---|---|---|---|---|---|---|
| 12 | Pd (0.1) | Ethyl alcohol | 60 | 1 | No hydrogenation | |
| 13 | Pd (0.1) | Glacial acetic acid | 60 | 1 | No hydrogenation | |
| 14 | Pt (0.1) | ...do... | 60 | 1 | No hydrogenation | |
| 15 | Rh (0.1) | ...do... | 60 | 1 | No hydrogenation | |
| 16 | Pd (0.1) | Glacial acetic acid plus 1.1 g. HClO$_4$. | 60 | 1 | 2.0 | 4.1 |
| 17 | Pd (0.025) | ...do... | 120 | 60 | 0.17 | 0.35 |
| 18 | Rh (0.025) | ...do... | 120 | 60 | 0.12 | 0.25 |
| 19 | Pt (0.025) | ...do... | 120 | 60 | 2.0 | (¹) |

¹ Undetermined.

TABLE II.—Hydrogenation of 10 mmol. (1.6 g.) 3-carboxyindazole in 30 ml. solvent at atmospheric pressure or of 20 mmol. 3-carboxyindazole in 50 ml. solvent at 60 atm. gauge pressure with various 5% carbon-carrier catalysts.

| Example Number | Indazole, g. | Catalyst metal (g.) | Solvent | Temp., °C. | Pressure, atm. gauge | Hydrogenation time, hrs. ½ | End |
|---|---|---|---|---|---|---|---|
| 1 | 1.2 | Pd (0.1) | Water | 60 | 1 | No hydrogenation | |
| 2 | 1.2 | Pd (0.1) | Water plus 0.36 g. HCl | 60 | 1 | 3.0 | 7.0 |
| 3 | 1.2 | Pt (0.1) | ....do | 60 | 1 | 5.0 | 11.0 |
| 4 | 1.2 | Rh (0.1) | ....do | 60 | 1 | 5.0 | 11.0 |
| 5 | 1.2 | Pd (0.1) | AcOH (99.9%) | 60 | 1 | 4.0 | 9.5 |
| 6 | 1.2 | Pd (0.1) | AcOH (2n) | 60 | 1 | 4.0 | 9.5 |
| 7 | 1.2 | Pd (0.1) | AcOH (50%) plus 0.5 g. $H_2SO_4$ | 60 | 1 | 0.5 | 1.2 |
| 8 | 1.2 | Pd (0.1) | AcOH (99.9%) plus 1.1 g. $HClO_4$. | 60 | 1 | 0.4 | 1.0 |
| 9 | 5.9 | Pd (0.025) | AcOH (99.9%) | 120 | 60 | 0.4 | 0.9 |
| 10 | 5.9 | Pt (0.025) | AcOH (99.9%) | 120 | 60 | 30% of the $H_2$ was absorbed and the hydrogenation stopped | |
| 11 | 5.9 | Rh (0.025) | AcOH (99.9%) | 120 | 60 | 0.3 | 0.9 |

TABLE III.—Hydrogenation of 10 mmol. (1.46 g.) 5.7-dimethylindazole in 50 ml. solvent at 60 atm. gauge pressure and 120° C.

| Example Number | Catalyst metal, g. | Solvent | Hydrogenation time, hours ½ | End |
|---|---|---|---|---|
| 20 | Pd (0.025) | Glacial acetic acid | No hydrogenation | |
| 21 | Pd (0.025) | 1.1 g. $HClO_4$ | 0.25 | 0.5 |
| 22 | Rh (0.025) | 1.1 g. $HClO_4$ | 0.1 | 0.25 |

TABLE IV.—Hydrogenation of 10 mmol. (1.46 g.) 2-ethylindazole in 30 ml. solvent at normal pressure and 60° C.

| Example Number | Catalyst metal, g. | Solvent | Hydrogenation time, hours ½ | End |
|---|---|---|---|---|
| 23 | Pd/$TiO_2$ (1.0) | Ethanol | 11.0 | 27.0 |
| 24 | Pd/$TiO_2$ (1.0) | Glacial acetic acid | 3.1 | 6.5 |
| 25 | | Glacial acetic acid plus 1.1 g. $HClO_4$. | 0.23 | 0.5 |

The indazoles most difficult to hydrogenate, i.e. those not substituted at the N position, such as indazole itself, 3-carboxyindazole, as well as the indazoles substituted in the benzene nucleus of the indazole, such as for example 5-methylindazole and 5,7-dimethylindazole, are hydrogenated very slowly in glacial acetic acid as solvent (Table I) or only and then rapidly, in the form of their salts of the strong acids (Tables II and III). This shows clearly that glacial acetic acid, known as the best solvent in difficult hydrogenation, is not sufficient for the success of the hydrogenation. Only after addition of strong acids can hydrogenation be carried out rapidly and with good yields (Tables II and III).

The activity of the platinum metals decreases in hydrogenation at atmospheric pressure in the order:

Pd>Rh≥Pt.

at higher pressure in the order: Rh>Pd>Pt.

The indazoles substituted at the position N are hydrogenated far more easily. The hydrogenation may even be carried out in neutral solvents such as ethyl alcohol, dioxane or tetrahydrofuran. The hydrogenation rate, however, increases considerably when strong acids are added to the hydrogenating solution (Table IV).

An important part of the invention thus deals with the correct choice of corresponding "solvents." A general rule applies to all indazoles: in addition to acetic acid or other lower carboxylic acids, water or other polar solvents, such as lower aliphatic alcohols, glycol ether, diethylether or tetrahydrofuran or their mixtures can generally be used if the compound to be hydrogenated is utilized in the form of its salt, or if a strong acid in a proportion of at least 1 equivalent per basic group is added to the solvent in which the indazoles are dissolved or suspended.

If no acid or acid in insufficient quantity is used, no hydrogenation takes place or the hydrogenation is incomplete (Table V), except in the case of a few easily hydrogenatable indazoles, substituted only in position 2 which can be hydrogenated slowly even in neutral solvents.

Tables I to V show that the hydrogenation rate depends on the kind of catalyst and solvent used and on the temperature and pressure.

TABLE V.—Hydrogenation of 1.2 g. indazole in 30 ml. water with 2.0 g. Pd/carbon (5% Pd) at 60° C. and 1 kg./cm.[2].

| Example No. | Equivalent HCl | Hydrogenation time (in hrs.) until absorption of 50% (100%) of the calculated hydrogen quantity |
|---|---|---|
| V(1) | 0.0 | No hydrogenation. |
| V(2) | 0.6 | After 30 hours 65% of the unhydrogenated indazole was removed. |
| V(3) | 1.0 | 3.1 (7.0). |
| V(4) | 2.0 | 2.4 (5.3). |

No hydrogenation takes place in water. Under addition of 0.6 mole equivalent HCl the indazole is not completely hydrogenated. After addition of 1 mole equivalent HCl the hydrogenation is rapid and complete (Ex. No. 3) and is accelerated with an excess of HCl (Ex. No. 4).

From the tables appear the best and most economical hydrogenation conditions for the method of the invention: the hydrogenation is generally carried out with Pd-, Pt-, or Rh-carrier catalysts in glacial acetic acid, dilute acetic acid or water with addition of at least equimolar quantities of strong acids (for example HCl, $H_2SO_4$, etc.), all of the basic nitrogen groups being neutralized by the acid, while acid can be present in excess at a temperature of 20 to 120° C. and at a hydrogen pressure of 1 to 80 kg./cm.[2]. A particularly economical method is the hydrogenation in water with rhodium or palladium in the presence of strong acids at higher pressure and temperature.

In the method of the invention the salts of the tetrahydroindazoles are thus formed. The technique is expounded in the following (hydrogenation methods A to D) which explains how to obtain the free base. Methods A to C show how to obtain the tetrahydroindazoles which do not form salts with bases. The tetrahydroindazoles which form salts with bases are processed according to 3,736,332 method D. Parts are by weight except when otherwise indicated.

Hydrogenation methods:

(A) 1 part of the compound to be hydrogenated is hydrogenated with 0.01 to 1 part of a 5% Pd, Pt, or Rh-carrier catalyst in 10 to 20 parts solvent at atmospheric pressure in a flask provided with a magnetic stirrer, or at higher pressure, in an autoclave. Reaction temperatures and pressures are shown in Table IV. When the calculated quantity of hydrogen is absorbed, the catalyst is filtered off and the filtrate is concentrated. The residue is then dissolved in water, made alkaline with a base such as NaOH and the hydrogenation product is filtered off, or if necessary, extracted with a solvent. The raw product is recrystallized from an appropriate solvent.

(B) The hydrogenation is carried out as under A. The catalyst is filtered off and the filtrate is concentrated. The residue is dissolved in water, the solution made alkaline and the hydrogenation product is extracted with chloroform, trichloroethylene, benzene or other solvents which are immiscible with water. The extract is then dried over a drying agent, the solvent is distilled off and the liquid product distilled under high vacuum or converted into the hydrochloride.

(C) The method is used for the separation of stereoisomers. The hydrogenation is carried out as under A. The raw product is separated chromatographically on silica acid-silica gels (Merck, particle size 0.2 to 0.5 mm.) by means of chloroform + 10% methanol. The thus-obtained products are then recrystallized from appropriate solvents.

(D) After the catalyst has been filtered off, the filtrate is concentrated, the quantity of alkali equivalent to the inorganic acid is added and the solution is evaporated to dryness. The residue is extracted with methanol or acetone, the extract concentrated, and if the hydrogenation product does not crystallize, is precipitated with ether or another appropriate solvent.

The following table (VI) shows examples of tetrahydroindazoles which can be prepared according to the method of the invention.

TABLE VI

| Original compound: Formulas IIa, IIb | | | | Hydrogenation conditions | | | | | End product Formulas Ia, Ib | | | |
|---|---|---|---|---|---|---|---|---|---|---|---|---|
| R₁ | R₂ | R₃ | R₄ | Method | Catalyst | Solvent | Temp. °C | Pressure, kg/cm² | 4,5,6,7-tetrahydro-compound | Example number | Yield, percent | M.P. °C |
| H | H | H | H | A | Rh/carbon | AcOH | 120 | 60 | Tetrahydroindazole | 1 | 90 | 82 |
| 1-methyl | H | H | H | B | Pd/BaSO₄ | H₂O plus HCl | 20 | 1 | 1-methyltetrahydroindazole | 2 | | Liquid |
| 2-methyl | H | H | H | B | Pd/BaSO₄ | do | 20 | 1 | 2-methyltetrahydroindazole | 3 | | Liquid |
| 1-ethyl | H | H | H | B | Pd/TiO₂ | do | 80 | 1 | 1-ethyltetrahydroindazole | 4 | | Liquid |
| 2-ethyl | H | H | H | B | Pd/TiO₂ | do | 80 | 1 | 2-ethyltetrahydroindazole | 5 | | Liquid |
| 1-hexadecyl | H | H | H | B | Rh/carbon | AcOH plus HCl | 120 | 60 | 1-hexadecyltetrahydroindazole | 6 | | Liquid |
| 1-benzyl | H | H | H | B | Pd/BaSO₄ | do | 60 | 60 | 1-benzyltetrahydroindazole | 7 | 72 | Liquid |
| 2-benzyl | H | H | H | B | Pd/BaSO₄ | do | 60 | 1 | 2-benzyltetrahydroindazole | 8 | 70 | 56 |
| 1-phenyl | H | H | H | A | Pd/BaSO₄ | AcOH plus H₂SO₄ | 120 | 60 | 1-phenyltetrahydroindazole | 9 | 76 | 48 |
| 2-phenyl | H | H | H | B | Pd/BaSO₄ | AcOH plus HCl | 60 | 1 | 2-phenyltetrahydroindazole | 10 | 81 | Liquid |
| 1-methyl | H | 5-methyl | H | B | Pt/BaSO₄ | AcOH plus HCl | 120 | 60 | 1,5-dimethyltetrahydroindazole | 11 | 92 | Liquid |
| 1-ethyl | H | do | H | B | Pt/BaSO₄ | do | 120 | 60 | 1-ethyl-5-methyltetrahydroindazole | 12 | 88 | Liquid |
| 2-ethyl | H | 5-methyl | H | B | Rh/carbon | AcOH | 120 | 60 | 2-ethyl-5-methyltetrahydroindazole | 13 | 87 | Liquid |
| Do | H | 7-methyl | H | A | Pd/TiO₂ | AcOH plus H₂SO₄ | 120 | 60 | 2-ethyl-7-methyltetrahydroindazole | 14 | 90 | 64 |
| 1-phenyl | H | 5-methyl | H | B | Pd/TiO₂ | AcOH plus HCl | 60 | 1 | 1-phenyl-5-methyltetrahydroindazole | 15 | 68 | Liquid |
| Do | H | do | H | A | Rh/carbon | AcOH plus HCl | 120 | 60 | 1-cyclohexyl-5-methyltetrahydroindazole | 16 | 91 | 161 |
| 1-(4-acetaminophenyl) | Methyl | H | H | A | Pd/TiO₂ | AcOH, 80% plus H₂SO₄ | 120 | 60 | 1-(4-acetaminophenyl)-3-methyltetrahydroindazole | 17 | 63 | (¹) |
| Do | H | do | H | C | Rh/TiO₂ | AcOH | 120 | 60 | Cis- and trans-1-[4-acetamino-cyclohexyl]-3-methyltetrahydroindazole | 18 | (²) | (²) |
| Do | H | do | H | C | Rh/TiO₂ | AcOH plus H₂SO₄ | 120 | 60 | Cis- and trans-1-[4-acetamino-cyclohexyl]-3,6-dimethyltetrahydroindazole | 19 | (³) | (²) |
| Do | H | 6-phenyl | H | A | Pd/BaSO₄ | AcOH plus HClO₄ | 120 | 60 | 1-[4-acetaminophenyl]-3-methyl-6-phenyl-trahydroindazole | 20 | 71 | 113 |
| Do | H | do | H | C | Rh/carbon | do | 120 | 60 | Cis- and trans-1-[4-acetaminocyclohexyl]-3-methyl-6-cyclohexyl-tetrahydroindazole | 21 | (⁴) | (⁵) |
| H | H | 4-methyl | 6-methyl | B | Pd/carbon | do | 120 | 60 | 1,4,6-trimethyltetrahydroindazole | 22 | 90 | Liquid |
| 1-methyl | H | do | do | D | do | do | 120 | 60 | 2,4,6-trimethyltetrahydroindazole | 23 | 87 | Liquid |
| 2-methyl | Methyl | H | H | A | Pd/BaSO₄ | H₂O plus HCl | 20 | 1 | 3-methyltetrahydroindazole | 24 | 80 | 73 |
| H | Phenyl | H | H | A | Pd/BaSO₄ | AcOH plus HCl | 60 | 1 | 3-phenyltetrahydroindazole | 25 | 68 | 234 |
| H | H | 5-methyl | H | B | Rh/carbon | H₂O plus HClO₄ | 120 | 60 | 5-methyltetrahydroindazole | 26 | 14 | 86 |
| H | H | 7-methyl | H | B | do | AcOH | 120 | 60 | 7-methyltetrahydroindazole | 27 | 78 | Liquid |
| H | H | 4-methyl | 6-methyl | A | do | AcOH | 120 | 60 | 4,6-dimethyltetrahydroindazole | 28 | 85 | 77 |
| H | H | 5-methyl | 7-methyl | A | Pd/TiO₂ | AcOH plus HClO₄ | 120 | 60 | 5,7-dimethyltetrahydroindazole | 29 | 93 | Liquid |
| H | Carboxy | H | H | A | Pd/carbon | do | 120 | 60 | 3-carboxytetrahydroindazole | 30 | 75 | 265 |
| H | Methoxy-carbonyl | H | H | A | Rh/carbon | AcOH | 120 | 60 | 3-methoxycarbonyltetrahydroindazole | 31 | 90 | 136 |
| 1-methyl | Carboxy | H | H | D | do | AcOH | 120 | 60 | 1-methyl-3-carboxytetrahydroindazole | 32 | 71 | 209 |
| 2-methyl | do | H | H | D | do | do | 120 | 60 | 2-methyl-3-carboxytetrahydroindazole | 33 | 76 | 204 |
| 1-ethyl | do | H | H | D | do | do | 120 | 60 | 1-ethyl-3-carboxytetrahydroindazole | 34 | 84 | 182 |
| 2-ethyl | do | H | H | D | do | AcOH plus HClO₄ | 60 | 1 | 2-ethyl-3-carboxytetrahydroindazole | 35 | 83 | 147 |
| 1-phenyl | do | H | H | D | Pd/TiO₂ | do | 120 | 60 | 1-phenyl-3-carboxytetrahydroindazole | 36 | 66 | 166 |
| 2-carboxyl methyl | do | 7-methyl | H | D | Pd/BaSO₄ | do | 120 | 60 | 2-carboxymethyl-7-methyltetrahydroindazole | 37 | 87 | 170 |

¹ 60 and 22.  ² 193 and 207.  ³ 60 and 35.  ⁴ 164 and 185.  ⁵ 45 and 43.  ⁶ 120 and 92.

The tetrahydroindazoles are plainly characterized by their IR spectrum. The aromatic oscillations of the benzene nucleus (depending on the kind of substitution, appearing between 670 and 900 cm.$^{-1}$), characteristic of the non-hydrogenated indazoles do not appear in the hydrogenated compounds. The (HN) association absorption laid between 2400 and 3500, characteristic of the pyrazole nucleus, remains in the indazoles non-substituted in position N.

Thin-layer chromatograms of the hydrogenated compounds show, with a few exceptions, some general rules. The more basic hydrogenation products migrate through silica gel H (Merck-solvent benzene/methanol 7:3 or chloroform/methanol 8:2; spots are made visible in iodine chamber) more slowly, their $R_f$-values are smaller than those of the non-hydrogenated original compounds.

All of the tetrahydroindazoles prepared according to the method of the invention can be used for example as corrosion inhibitors particularly for copper and copper alloys, as age-resisting agents in mineral oils, fuel oils and rubber, and as intermediates in the manufacturing of pharmaceuticals and agro-chemicals.

I claim:

1. A method of preparing a 4,5,6,7-tetrahydroindazole, comprising the step of hydrogenating an indazole of the formula:

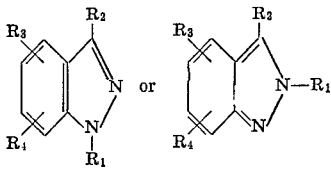

in which:

$R_1$ is hydrogen, unbranched or branched alkyl of up to 18 carbon atoms, carboxyalkyl of up to 4 carbon atoms in the alkyl group, phenyl, acetamidophenyl or phenyl-lower alkyl;

$R_2$ is hydrogen, lower alkyl, carboxy, phenyl or methoxycarbonyl;

$R_3$ is hydrogen, unbranched or branched alkyl of up to 18 carbon atoms or phenyl; and $R_4$ is hydrogen or unbranched or branched alkyl of up to 4 carbon atoms, in the presence of at least one equivalent of a strong-acid moiety of an acid selected from the group which consists of $HClO_4$, $HCl$ and $H_2SO_4$ per basic-nitrogen of the indazole, with a catalyst system selected from the group consisting of palladium, rhodium and platinum and mixtures thereof in a solvent selected from the group consisting of lower alkanoic acids, lower alkanols, glycol ether, diethyl ether, dioxane, tetrahydrofuran and mixtures thereof, and in which said indazole is at least slightly soluble, at a hydrogenation temperature and pressure to yield a product of the formula

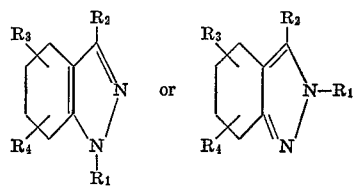

or the salt thereof with said acid moiety, $R_1$, $R_2$, $R_3$ and $R_4$ having the above-stated meaning except that where they are or contain phenyl they can represent cyclohexyl in the product.

2. The method defined in claim 1, further comprising the step of converting said product into the corresponding free base.

3. The method defined in claim 1 wherein said catalyst system is formed upon a carrier.

4. The method defined in claim 3 wherein said catalyst system is a palladium catalyst and said carrier is selected from the group which consists of carbon, barium sulfate, titanium dioxide, aluminum oxide and silicic acid.

5. The method defined in claim 3 wherein said catalyst system is rhodium and said carrier is selected from the group which consists of carbon, barium sulfate, titanium dioxide, aluminum oxide and silicic acid.

6. The method defined in claim 3 wherein said catalyst system is platinum and said carrier is selected from the group which consists of carbon, barium sulfate, titanium dioxide, aluminum oxide and silicic acid.

7. The method defined in claim 3 wherein the hydrogenation is carried out at a temperature between substantially 20° and 120° C. at a hydrogen pressure between substantially 1 and 120 kg./cm.$^2$.

8. The method defined in claim 7 wherein the hydrogenation is carried out in the presence of a rhodium catalyst.

9. The method defined in claim 8 wherein the hydrogenation is carried out in the presence of acetic acid, lower alkanol, glycol ether, diethyl ether, dioxane, tetrahydrofuran or mixtures thereof.

10. The method defined in claim 9 wherein the hydrogenation is carried out at a temperature of 60 to 150° C. at a pressure of 15 to 120 kg./cm.$^2$.

11. The method defined in claim 7 wherein the hydrogenation is carried out over a palladium catalyst.

References Cited

Fries et al., Liebigs Ann. Chem. vol. 550, pp. 31–49 (1942).

NATALIE TROUSOF, Primary Examiner

U.S. Cl. X.R.

252—390, 392; 260—211, 247.2 R, 247.2 A, 247.2 B, 247.5 B, 268 BC, 293.6, 295 F, 296 B, 308 R, 310 C